United States Patent [19]
Blise et al.

[11] Patent Number: 5,983,757
[45] Date of Patent: Nov. 16, 1999

[54] RATCHET MECHANISM WITH LAMINATED PARTS AND METHOD OF MAKING SAME

[75] Inventors: Bernard G. Blise; Edward S. Wahoski, both of Kenosha, Wis.

[73] Assignee: Snap-on Technologies, Inc., Lincolnshire, Ill.

[21] Appl. No.: 08/867,662

[22] Filed: Jun. 2, 1997

[51] Int. Cl.⁶ .................................................. B25B 13/46
[52] U.S. Cl. ............................... 81/57.39; 81/62; 81/63.1
[58] Field of Search ........................... 81/57.39, 62, 63.1; 192/43.1

[56] References Cited

U.S. PATENT DOCUMENTS

| | | |
|---|---|---|
| 3,603,181 | 9/1971 | Shultz . |
| 3,657,949 | 4/1972 | Myers . |
| 3,695,125 | 10/1972 | Glass et al. . |
| 3,709,073 | 1/1973 | Kurtz . |
| 3,745,860 | 7/1973 | Bennett . |
| 3,973,318 | 8/1976 | Strachan . |
| 3,979,979 | 9/1976 | Grabovac . |
| 3,985,050 | 10/1976 | Lurie . |
| 3,985,342 | 10/1976 | Denman ................................... 254/164 |
| 4,382,476 | 5/1983 | Swenson . |
| 4,383,787 | 5/1983 | Reynolds . |
| 4,455,894 | 6/1984 | Roberts . |
| 4,765,449 | 8/1988 | Peters . |
| 5,022,289 | 6/1991 | Butzen . |
| 5,199,332 | 4/1993 | Batten . |
| 5,537,899 | 7/1996 | Diedrich . |

Primary Examiner—David A. Scherbel
Assistant Examiner—Benjamin M. Halpern
Attorney, Agent, or Firm—Emrich & Dithmar

[57] ABSTRACT

A laminated ratchet tool includes a laminated ratchet head defining an internal gear and a pawl mechanism carried by the ratchet head and including two laminated pawls arranged for ratcheting engagement with the gear teeth. Each of the laminated parts includes a plurality of plates arranged in a congruent stack and fixedly secured together, as by brazing. Each plate is formed by stamping and has plural orienting structures stamped therein, each such structure being a displaced portion which forms a recess at one side of the plate and a projection extending from the other side of the plate, so that the projections on one plate mate in the recesses of an adjacent plate to facilitate alignment of the plates. The ratchet head includes toothed inner plates which define the internal gear and untoothed outer plates which define bearing surfaces for the pawl mechanism.

8 Claims, 5 Drawing Sheets

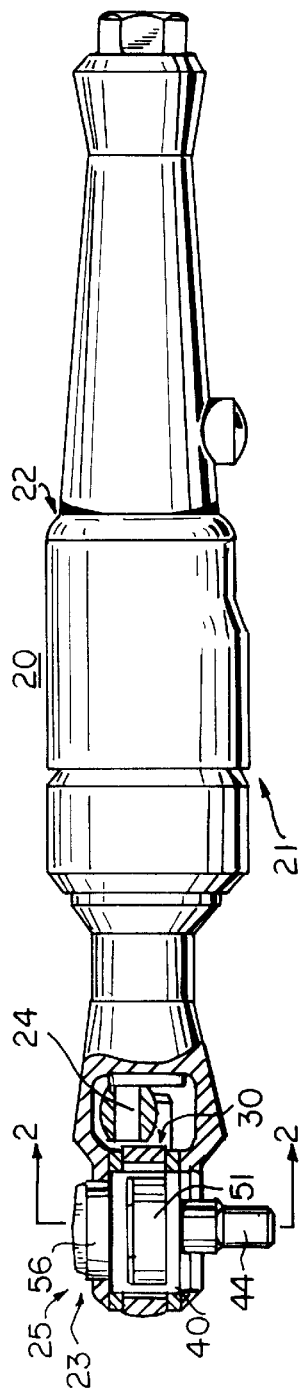
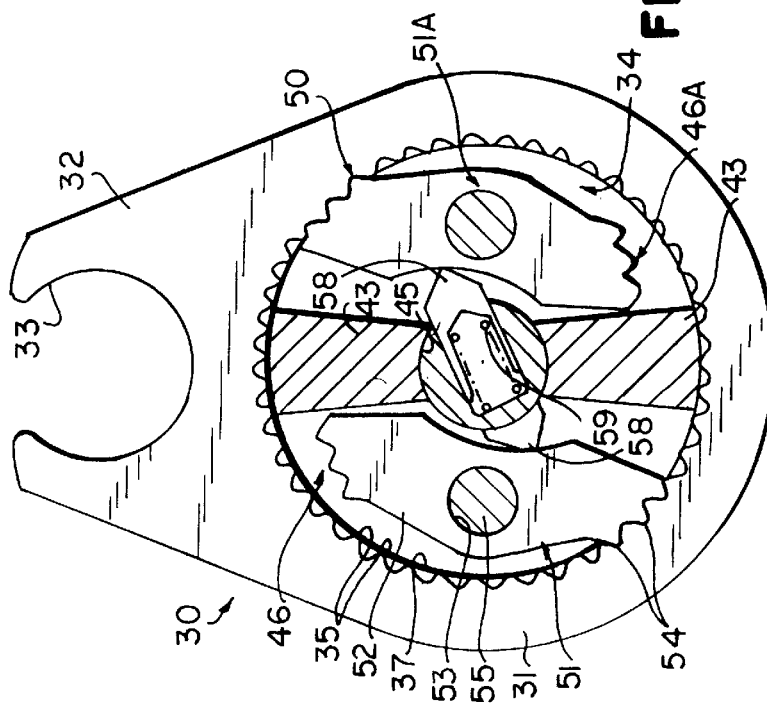
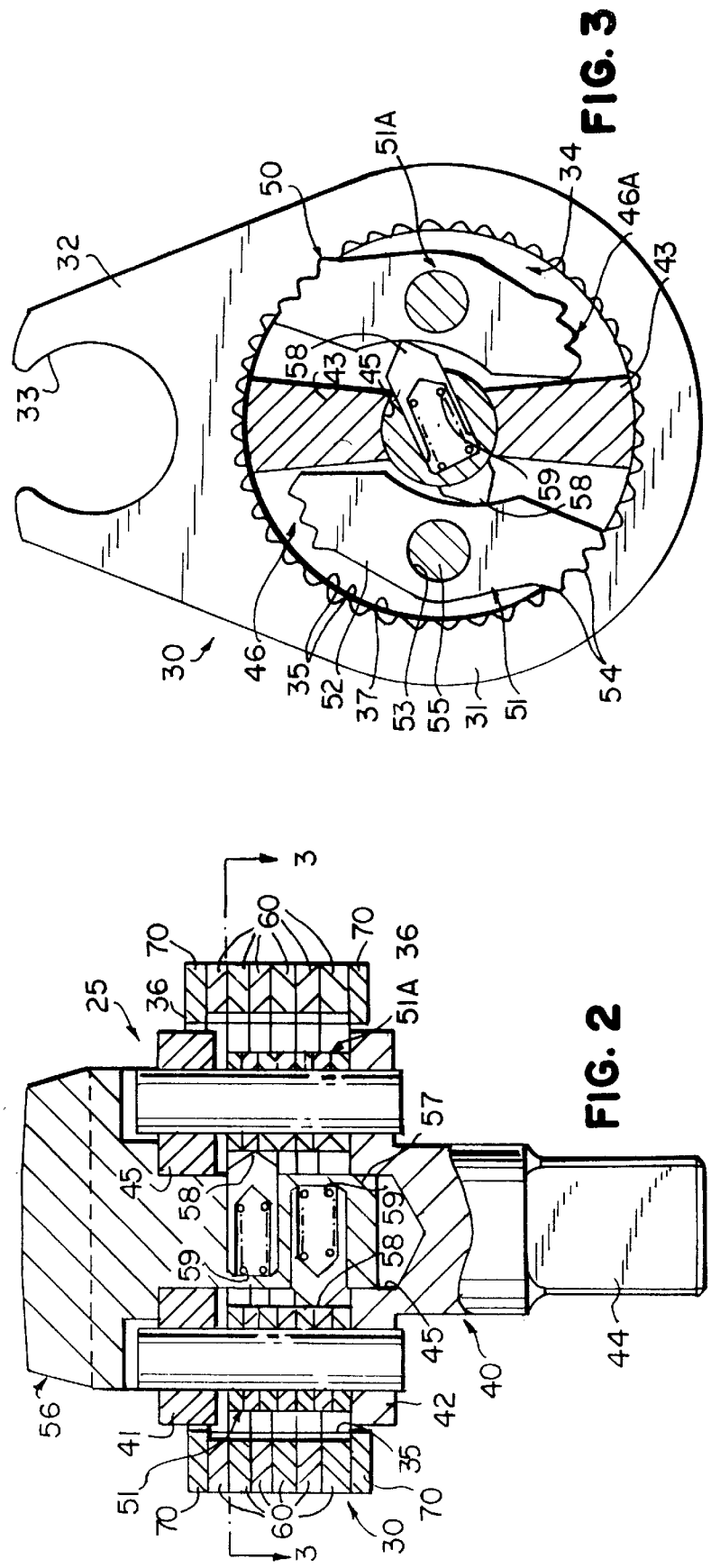

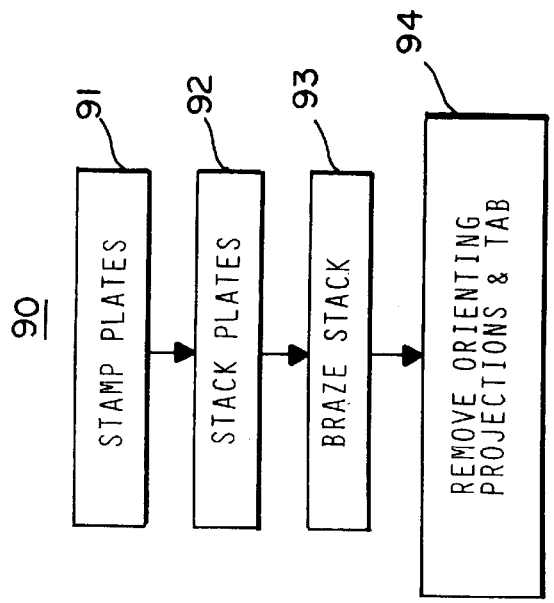
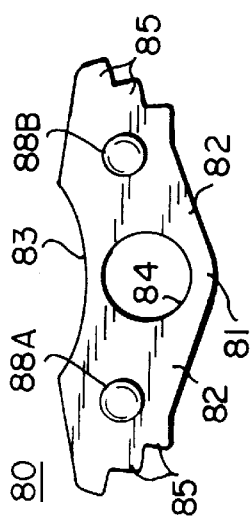
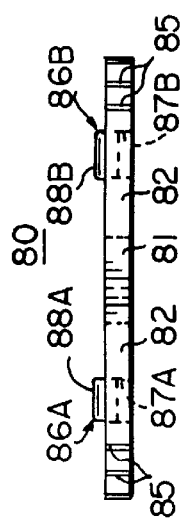
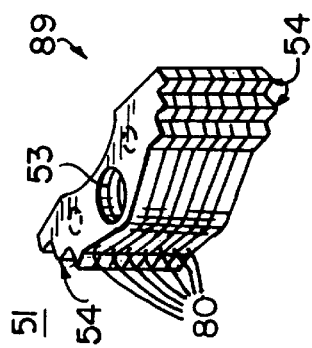

RATCHET MECHANISM WITH LAMINATED PARTS AND METHOD OF MAKING SAME

BACKGROUND OF THE INVENTION

1. Field of the Invention

The present invention relates generally to ratchet tools and the ratchet mechanisms therefor and, more specifically, to the toothed portions of the ratchet mechanisms.

2. Description of the Prior Art

Ratchet tools, such as wrenches and the like, are well known and typically include a gear member disposed for engagement with one or more pawls. The gear member may be arranged as either an internal or external gear, typically a spur gear. The present invention has particular application to ratchet mechanisms of the type which utilize internal gears, with the pawl mechanism being disposed inside the gear. Such mechanisms are disclosed, for example, in U.S. Pat. No. 4,765,449 to Peters and U.S. Pat. No. 5,537,899 to Dietrich, the former disclosing a manually-operated ratchet wrench, and the latter disclosing a power-operated ratchet wrench. In both cases the ratchet mechanism is of a dual-pawl configuration, although it will be appreciated that similar mechanisms utilizing a single pawl are also known. While the following discussion will be fundamentally in the context of ratchet mechanisms of the types disclosed in the aforementioned patents, this is simply for purposes of illustration, and it will be understood that the present invention and the fundamental principles thereof have application to ratchet tools and ratchet mechanisms generally.

In such prior ratchet tools, the gear and the pawls are typically formed from forged blanks with the teeth being broached on the parts. The parts must then undergo further machining and other finishing processes, resulting in high manufacturing costs. Furthermore, the broaching may leave broach "drag" marks on the finished parts, which can cause surface imperfections.

In any ratchet tool, particularly power tools, the toothed parts are, by the nature of the ratchet operation, subjected to high wear. Thus, these parts are typically designed as replacement items, particularly in the case of power tools. This tends to increase the overall cost and inconvenience of operation of the tool to the end user.

Furthermore, in ratchet tools of the type disclosed in the aforementioned patents, the ratchet head or gear essentially "floats" around the drive body which carries the pawls, and is supported by the working action of the pawls, which are located approximately 180° apart. This "floating" action allows the ratchet head to move off center and thereby allows greater or lesser engagement of the pawl teeth with the ratchet gear teeth. This action tends to accelerate wear of the components and aggravates self-reversing or lock-up caused when the teeth on the pawl do not properly engage the gear teeth. In this event, one pawl may snap to the opposite position and thus allow the pawls to oppose each other and prevent operation in either direction. This tendency to self-reversing or lock-up is not only a great inconvenience to the user, but leads to excessive warranty costs. In the tool of U.S. Pat. No. 5,537,899, pawl-end positioning pins have been added to alleviate the tendency to lock-up. But this complicates the construction and assembly and does not cure the "floating" action and resulting imbalance which aggravate the tendency to excessive wear of the toothed parts.

SUMMARY OF THE INVENTION

It is a general object of the invention to provide an improved ratchet tool and parts thereof which avoid the disadvantages of prior ratchet tools and ratchet mechanisms while affording additional structural and operating advantages.

An important feature of the invention is the provision of a toothed ratchet member which has greatly increased wear resistance.

Another feature of the invention is the provision of toothed ratchet parts of the type set forth which are of economical construction.

Still another feature of the invention is the provision of a ratchet mechanism which inhibits self-reversing or lock-up conditions.

In connection with the foregoing feature, another feature of the invention is the provision of a ratchet mechanism of the type set forth, which maintains the intergaging toothed parts in proper balanced relationship with one another.

Another feature of the invention is the provision of a method of forming a ratchet mechanism and parts therefore of the type set forth.

Yet another feature of the invention is the provision of laminated toothed ratchet parts and a method of forming same.

Certain ones of these and other features of the invention are attained by providing a laminated ratchet member comprising a plurality of plates fixedly secured together in a stack, each of the plates having plural tooth portions projecting therefrom, the plates being arranged in the stack with the tooth portions of each plate respectively substantially congruent with the corresponding tooth portions of adjacent plates for cooperation to define teeth on the laminated member.

Further features of the invention are attained by providing a laminated ratchet head comprising a plurality of inner plates fixedly secured together in a stack, each of the inner plates having a generally circular opening therethrough with a plurality of circumferentially spaced-apart and radially inwardly extending gear tooth portions formed around the periphery thereof, the openings being arranged in coaxial congruent relations hip with the tooth portions of each inner plate respectively cooperating with corresponding tooth portions on other inner plates in the stack to define gear teeth so that the inner plates cooperate to define an internal gear with the gear teeth having crests defining a circle having a predetermined crest diameter, and an outer plate fixedly secured to an outermost one of the inner plates of the stack, the outer plate having a circular aperture therethrough coaxial with the openings and having a diameter no greater than the crest diameter.

Still further features of the invention are attained by providing a ratchet tool comprising: a laminated ratchet head including a plurality of head plates fixedly secured together in a head stack, the head plates including a plurality of inner head plates each having a generally circular opening therethrough with a plurality of circumferentially spaced-apart and radially inwardly extending gear tooth portions formed around the periphery thereof, the openings being arranged in coaxial congruent relationship with the tooth portions of each inner head plate respectively cooperating with the corresponding tooth portions on other inner head plates in the head stack to define gear teeth so that the inner head plates cooperate to define an internal gear with the gear teeth having crests defining a circle having a predetermined crest diameter, and an outer head plate fixedly secured to an outermost one of inner head plates in the head stack, the outer head plate having a circular aperture therethrough coaxial with the openings and having an inner diameter no greater than the crest diameter; and a pawl mechanism carried by the ratchet head and including a laminated pawl having a plurality of pawl plates fixedly secured together in a pawl stack, each of the pawl plates having a plurality of tooth portions projecting therefrom, the pawl plates being arranged so that the tooth portions of each pawl plate are respectively substantially congruent with corresponding tooth portions of adjacent pawl plates in the pawl stack for cooperation to define pawl teeth, the pawl mechanism being arranged so that the pawl teeth are disposed for ratcheting engagement with the gear teeth.

Still other features of the invention are attained by providing a method for forming a ratchet member comprising the steps of providing a plurality of substantially identical plates each having a plurality of tooth portions projecting therefrom, arranging the plates in a congruent stack with the tooth portions of each plate respectively substantially congruent with corresponding tooth portions of adjacent plates, and fixedly securing the plates together in the stack to form the ratchet member with the tooth portions cooperating to define teeth of the ratchet member.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a side elevational view in partial section of a ratchet tool in accordance with the present invention;

FIG. 2 is an enlarged view in vertical section taken generally along the line 2—2 in FIG. 1;

FIG. 3 is a view in horizontal section taken generally along the line 3—3 in FIG. 2;

FIG. 11 is a top plan view of a plate used in forming one of the pawls of the ratchet assembly of FIGS. 2 and 3;

FIG. 12 is an elevational view of the plate of FIG. 11;

FIG. 13 is a perspective view of a completed pawl formed from a stack of the plates of FIGS. 11 and 12; and FIG. 14 is a functional block diagrammatic illustration of the method of forming the ratchet head of FIG. 10 and the pawl of FIG. 13.

DESCRIPTION OF THE PREFERRED EMBODIMENT

Figure 6:
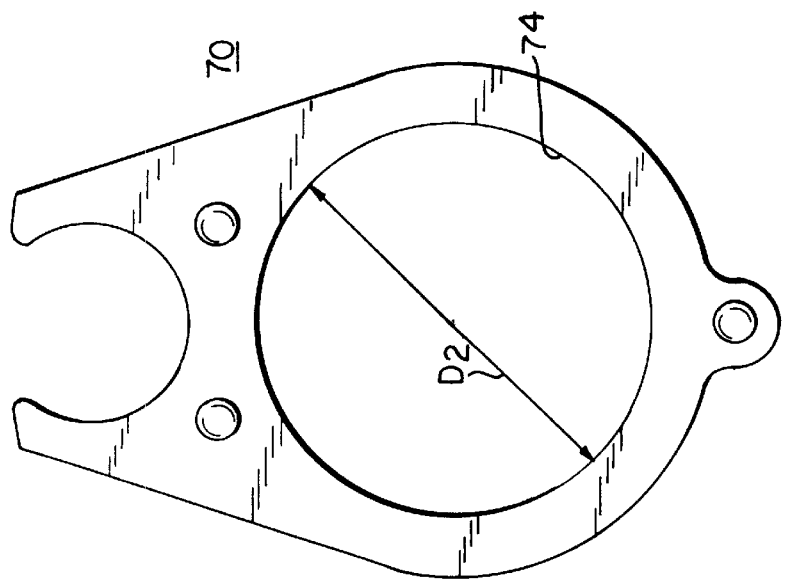
FIG. 6 is a view similar to FIG. 4 of another of the plates of the ratchet head of the present invention.

Referring to FIG. 1, there is illustrated a power-driven ratchet tool in the nature of a reversible ratchet wrench 20. The wrench 20 has an elongated housing 21 with a handle portion 22 and a head portion 23. The wrench 20 is of the type which utilizes an air-driven motor disposed in the housing 21, but it will be appreciated that the principles of the present invention are applicable to electrically powered tools as well as hand-operated ratchet tools. The air motor (not shown) has an output shaft which is coupled to a drive element 24 which is, in turn, coupled to a ratchet assembly 25 disposed in the head portion 23 and constructed in accordance with and embodying the features of the present invention.

Referring also to FIGS. 2 and 3, the ratchet assembly 25 includes a ratchet head 30 in which is disposed a drive body 40 carrying a pawl assembly 50. The ratchet head 30 is generally teardrop-shaped, having a part-circular front-end portion 31 and a rear-end portion 32 in which is formed a part-circular cutout 33 dimensioned for receiving therein the drive element 24 (see FIG. 1). Formed through the front-end portion 31 is a large, generally circular hole 34 having an axis extending into the paper at the center of the circle. As will be explained more fully below, the ratchet head 30 is of laminated construction, the axially endmost laminae of which respectively form end portions 36 of predetermined axial thickness, respectively at the upper and lower axial ends of the head 30, the circular hole 34 defining circular bearing surfaces 37, respectively on these end portions 36. Intermediate the end portions 36, the ratchet head 30 has formed therein a plurality of equiangularly circumferentially spaced gear teeth 35 so as to define an internal spur gear. The crests of the teeth 35 define a common crest circle which has a diameter at least as great as the diameter of the circular bearing surfaces 37.

The drive body 40 has a pair of axially spaced-apart circular end walls 41 and 42 dimensioned to fit in the circular hole 34 of the ratchet head 30, the end walls 41 and 42 being spaced-apart by a pair of diametrically aligned and spaced-apart webs 43. Unitary with the bottom one of the end walls 42 and projecting outwardly therefrom axially thereof is a square drive lug 44. A circular center bore 45 is formed through the end walls 41 and 42 and between the webs 43 and extends a slight distance into the square drive lug 44. The areas between the end walls 41 and 42, and respectively on opposite sides of the webs 43, define pawl compartments 46 and 46A.

The pawl assembly 50 includes substantially identical pawls 51 and 51A which are respectively disposed in the pawl compartments 46 and 46A, and each of which is of laminated constructions, as will be explained in greater detail below. Each pawl has an elongated body 52 having a circular central hole 53 formed therethrough and provided at each end thereof with a plurality of pawl teeth 54. The pawls are respectively pivotally mounted on pivot pins 55, which are respectively received through the holes 53 and through complementary bores in the circular end walls 41 and 42 of the drive body 40.

The pawl assembly 50 also includes a selector knob 56, which has an elongated shaft 57 which fits down through the central bore 45 of the drive body 40. Two plungers 58 are respectively received in axially spaced radial bores in the shaft 57 and are resiliently biased radially outwardly in diametrically opposed directions, respectively, by compression springs 58a for resilient biasing engagement with bearing surfaces 59 of the pawls 51 and 51A, respectively. The selector knob 56 is manually rotatable between forward and reverse ratcheting positions, in one of which positions the plungers 58 hold the pawl teeth 54 at one end of the pawls in ratcheting engagement with the ratchet head gear teeth 35 for ratcheting an operation in one direction, and in the other of which positions the other ends of the pawls are held in ratcheting engagement with the ratchet head gear teeth, in a known manner.

Figure 5:
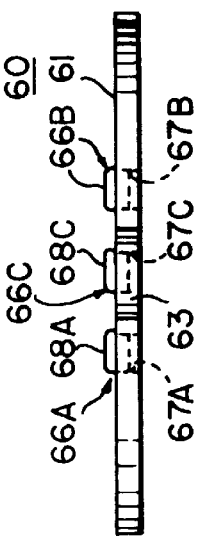
FIG. 5 is a front elevational view of the plate of FIG. 4.
Figure 4:
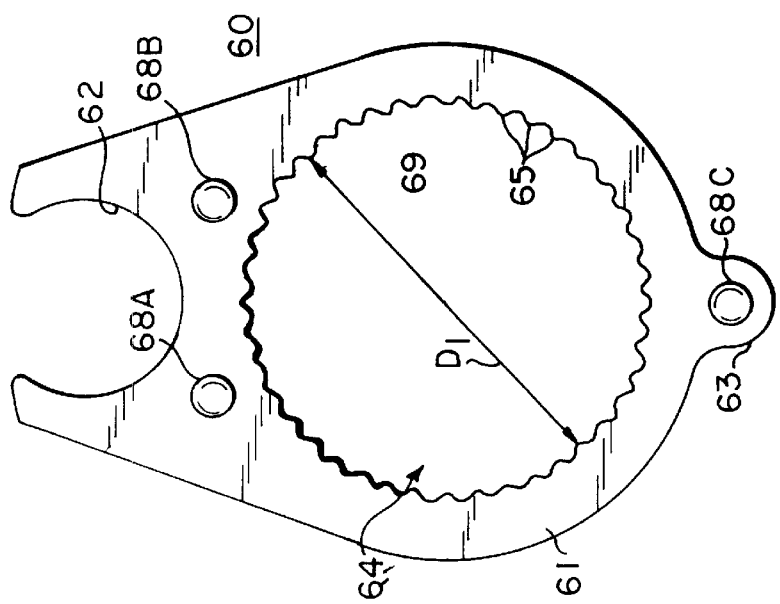
FIG. 4 is a top plan view of one of the plates of the laminated ratchet head of the ratchet assembly of FIGS. 2 and 3.

Referring now also to FIGS. 4–10, the ratchet head 30 is formed of a laminated stack of plates of two different types, viz., inner plates 60 and outer plates 70. Referring to FIGS. 4 and 5, each of inner plates 60 is generally teardrop-shaped, having a main body 61 with a part-circular cutout 62 at one end thereof and a tab portion 63 projecting from the opposite end thereof. Formed through the main body 61 is a large, generally circular opening 64 having formed around the periphery thereof a plurality of equiangularly spaced-apart, radially inwardly extending tooth portions 65. The inner plate 60 is also provided with three orienting structures or dimples, respectively generally designated 66A, 66B and 66C. The dimples 66A and 66B are laterally spaced apart between the cutouts 62 and the opening 64, while the dimple 66C is located in the tab portion 63. Preferably, the inner plate 60 is formed by a stamping operation, each of the dimples 66A–C being formed during the stamping operation by displacing the plate material upwardly, so that the dimples respectively define recesses 67A–C at one side of the plate 60 and outwardly extending projections 68A–C at the other side thereof, as can best be seen in FIG. 5. Preferably the tooth portions 65 have crests which lie along a common imaginary crest circle 69 having a diameter D1.

Referring to FIG. 6, each of the outer plates 70 is substantially identical to the inner plates 60, with the exception that the outer plate 70 has a large circular aperture 74 which is untoothed and which has a diameter D2 which is less than or equal to the diameter D1 of the crest circle 69 of the inner plate 60.

Figure 7:
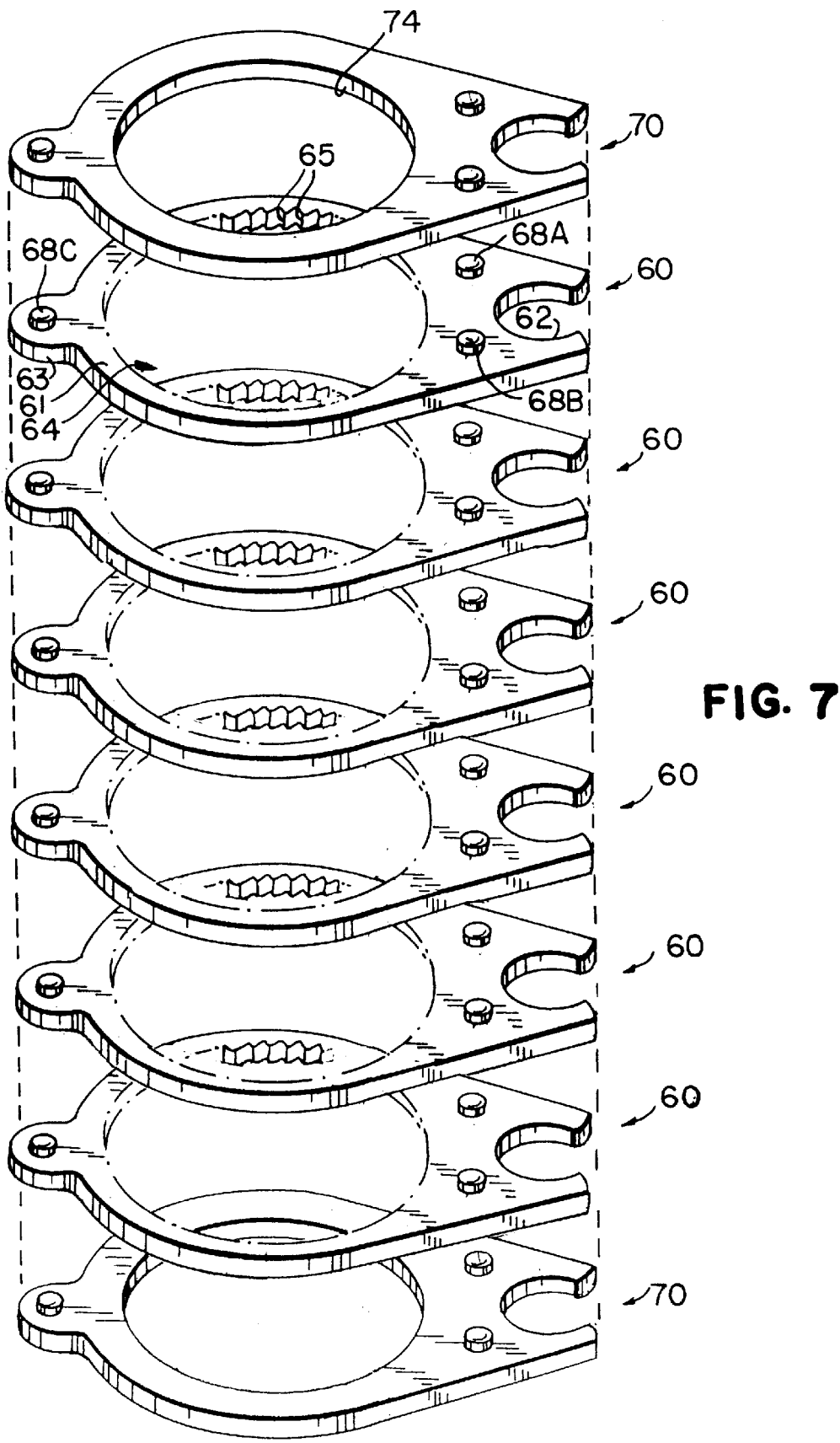
FIG. 7 is a perspective view illustrating a plurality of the plates of FIGS. 4 and 6 arranged for assembly in a stack.
Figure 10:
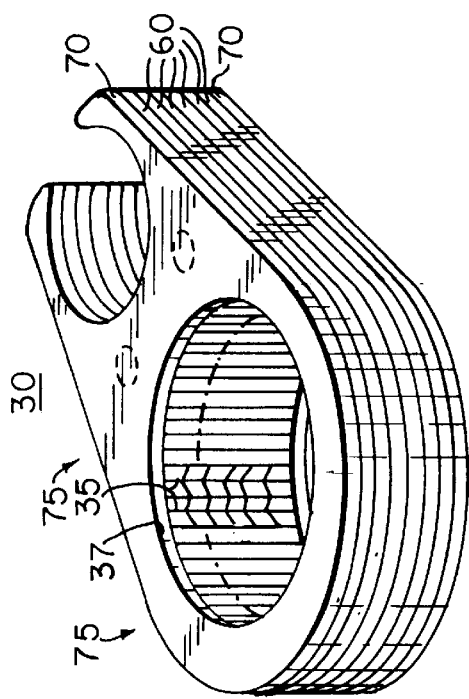
FIG. 10 is a perspective view of the finished ratchet head of the ratchet assembly of FIGS. 2 and 3.

In forming the ratchet head 30, a plurality of inner and outer plates 60 and 70 are arranged in a congruent stack, as indicated in FIG. 7. The stack includes two of the outer plates 70, one at the bottom and one at the top, with a plurality of the inner plates 60 stacked between the outer plates 70. In the illustrated embodiment, six of the inner plates 60 are provided, but it will be appreciated that the number could vary depending upon the application. The orienting dimples 66A–C facilitate arrangement of the stacked plates in exactly congruent fashion. Thus, the projections 68A–C of each plate 60 or 70 are respectively fitted into the corresponding recesses 67A–C of the overlying plate. The stacked plates are then preferably pressed together in a suitable fixture so that the projections 68A–C are, respectively, press-fitted into the mating recesses 67A–C form a stack 75 (FIGS. 8 and 9), with the plates firmly held together in abutting relationship.

The stack 75 then undergoes a brazing operation, in which a suitable brazing compound is applied to the stack and the stack is then subjected to heat in an oven at a temperature sufficient to liquify the brazing compound for a time sufficient to allow the brazing compound to migrate, by capillary action, between the stacked plates so as to substantially cover all of the abutting surfaces of the stacked plates. Then, the stack is cooled to set the abrazing compound, resulting in a brazed stack wherein the stacked plates are permanently secured together to form an integral body. It has been found that the inter-plate joints formed by the brazing operation have a strength which exceeds that of the original plate material.

Figure 9:
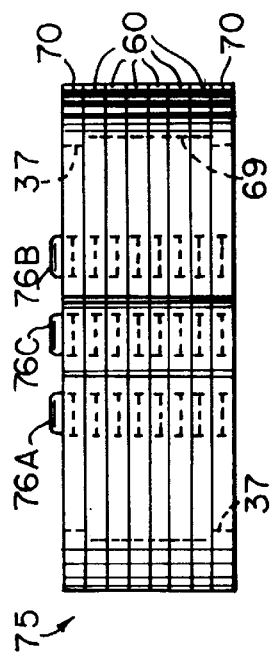
FIG. 9 is a front elevational view of the stack of FIG. 8.
Figure 8:
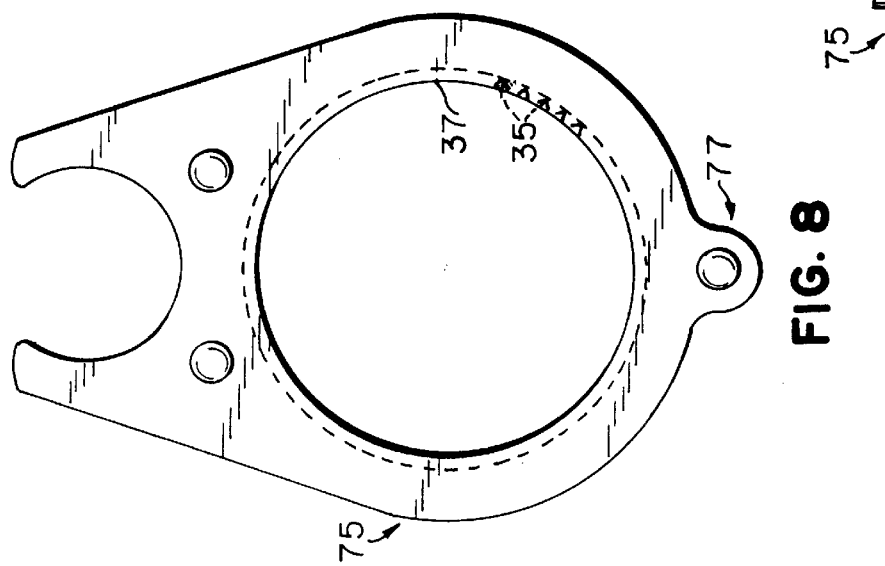
FIG. 8 is a top plan view of the assembled stack of the plates of FIG. 7.

As can be seen in FIGS. 8 and 9, the finished stack 75 has the orienting projections of the topmost outer plate 70 projecting from the stack, these projections being respectively designated 76A, 76B and 76C in FIGS. 8 and 9. Furthermore, it can be seen that the tab portions 63 of the stacked plate cooperate in the finished stack to define a projecting tab 77, which is unnecessary in the ratchet head 30. Thus, as a final step in the process of forming the ratchet head 30, the brazed stack 75 is machined to remove the projections 76A and B and to completely remove the tab 77 along with its projection 76C, resulting in the finished ratchet head 30 illustrated in FIG. 10, in which the cutouts 62 cooperate to form the cutout 33 and the openings 64 and apertures 74 cooperate to form the hole 34. It is a significant aspect of the invention that, in the finished ratchet head 30 the diameter D2 of the bearing surfaces 37 is less than or equal to the diameter D1 of the crest circle 69 of the gear teeth, as can best be seen in FIGS. 8 and 9. In FIG. 9, the diameter of the crest circle 69 has been illustrated as significantly greater than that of the bearing surfaces 37, simply for purposes of illustration, but this difference is somewhat exaggerated and, in practice, there will typically be less difference between the diameters. In any event this feature permits the parts of the ratchet assembly 25 to remain centered while still accommodating proper ratcheting engagement of the gear with the associated pawls, as will be explained more fully below.

Referring now to FIGS. 11–13, the formation of the pawls 51 and 51A will be described. Since these pawls are identical, the description will be with respect to the pawl 51. The pawl 51 comprises a laminated stack of plates 80 which are identical in construction, each having an elongated body 81 provided with a pair of laterally outwardly extending arms 82 with an arcuate bearing surface 83 therebetween. Formed through the body 81 centrally thereof is a circular pivot opening 84. Projecting outwardly from the distal ends of each of the arms 82 are a plurality of tooth portions 85. The plate 80 is provided with a pair of orienting structures or dimples 86A and 86B. The plate 80 is preferably formed by stamping, the dimples 86A and 86B being formed by displacing material from the body 81 during the stamping operation, so as to define recesses 87A and 87B at one side of the plate and projections 88A and 88B projecting from the opposite side thereof, as can best be seen in FIG. 12.

In forming the pawl 51, a plurality of the plates 80 are stacked in congruent relationship in the same general manner described above in connection with the plates of the ratchet head 30. The orienting dimples 86A and 86B serve the same general orienting function as described above, to ensure that the plates 80 are stacked in congruent relationship, the stacked plates then being subjected to pressing in a suitable fixture to press-fit the projections 88A and 88B, respectively, into the recesses 87A and 87B of overlying plates, resulting in a stack 89 indicated in FIG. 13. The stack 89 is then brazed in the same manner described above with respect to the ratchet head 30. The resulting brazed stack has the projections 88A and 88B of the topmost plate projecting therefrom, and these are removed in a final machining step to produce the finished pawl 51.

In FIG. 14, there is illustrated a generalized functional block diagram of the fabrication process 90 which applies to both the ratchet head 30 and the pawls 51 and 51A. In this process, the plates (60, 70 and 80) are first stamped in a step 91 and then they are stacked in the appropriate order and pressed together in a step 92. The assembled stack is then brazed in a step 93 and, after brazing, external orienting projections and the tab of the ratchet head stack are removed in a machining operation at 94.

After formation of the ratchet head 30 and the pawls 51 and 51A, those parts are assembled into the ratchet assembly 25 in a known manner. In this regard, the thickness of the pawls 51 and 51A is such that they will engage the gear teeth 35 of the ratchet head 30 between the end portions 36 thereof, while the circular bearing surfaces 37 of the end portions 36 will respectively engage the drive body end walls 41 and 42 to keep the drive body 40 and pawl assembly 50 centered in the ratchet head 30. By thus effectively preventing misalignment of the parts, the present invention greatly minimizes wear on the toothed portions of the ratchet head 30 and the pawls 51, 51A and minimizes the risk of lock-up of the ratchet assembly 25. The greatly increased strength of the brazed, laminated ratchet head 30 and pawls 51 and 51A further significantly inhibits wear thereof. In constructional prototypes of the present invention, ratchet tools incorporating the ratchet assembly 25 of the present invention have been used for several years without significant wear.

From the foregoing, it can be seen that there has been provided an improved ratchet mechanism and method of making same, which result in greatly increased wear-resistance and significantly reduced tendency to lock-up of the associated ratchet tool, while affording significant manufacturing and assembly economies and greatly reduced instances of malfunction.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. A laminated head for use in a ratchet, the head comprising:
   a plurality of inner plates fixedly brazed together in a stack,
      each of said inner plates having a generally circular opening therethrough with a plurality of circumferentially spaced-apart and radially inwardly extending gear tooth portions formed around the periphery thereof,
      said openings being arranged in coaxial congruent relationship with the tooth portions of each inner plate respectively cooperating with corresponding tooth portions on other inner plates in the stack to define gear teeth so that said inner plates cooperate to define an internal gear with the gear teeth having crests defining a circle having a predetermined crest diameter, and
   an outer plate fixedly secured to an outermost one of the inner plates of the stack,
      said outer plate having a circular aperture therethrough coaxial with said openings and having a diameter no greater than said crest diameter.

2. The ratchet head of claim 1, wherein each of said plates includes orienting structure for cooperation with like structure of other plates in the stack to facilitate proper alignment and orientation of the plates in the stack.

3. The ratchet head of claim 2, wherein said orienting structure includes at least one deformed portion of the plate displaced so as to provide a recess at one side of the plate and a projection extending outwardly from the opposite side of the plate.

4. The ratchet head of claim 1, wherein said outer plate is a first outer plate, and further comprising a second outer plate substantially identical to said first outer plate, said outer plates being respectively fixedly secured to the outermost ones of the inner plates of the stack.

5. A ratchet tool comprising:
   a laminated ratchet head including a plurality of head plates fixedly brazed together in a head stack,
      said head plates including a plurality of inner head plates each having a generally circular opening therethrough with a plurality of circumferentially spaced-apart and radially inwardly extending gear tooth portions formed around the periphery thereof,
      said openings being arranged in coaxial congruent relationship with the tooth portions of each inner head plate respectively cooperating with the corresponding tooth portions on other inner head plates in the head stack to define gear teeth so that said inner head plates cooperate to define an internal gear with the gear teeth having crests defining a circle having a predetermined crest diameter, and
   an outer head plate fixedly secured to an outermost one of inner head plates in the head stack, said outer head plate having a circular aperture therethrough coaxial with said openings and having an inner diameter no greater than said crest diameter; and
   a pawl mechanism carried by said ratchet head and including a laminated pawl having a plurality of pawl plates fixedly brazed together in a pawl stack,
      each of said pawl plates having a plurality of tooth portions projecting therefrom,
      said pawl plates being arranged so that the tooth portions of each pawl plate are respectively substantially congruent with corresponding tooth portions of adjacent pawl plates in the pawl stack for cooperation to define pawl teeth,
      said pawl mechanism being arranged so that said pawl teeth are disposed for ratcheting engagement with said gear teeth.

6. The ratchet tool of claim 5, wherein each of said plates includes orienting structure for cooperation with like structure of other plates in the associated stack to facilitate proper alignment and orientation of the plates in the stack.

7. The ratchet tool of claim 5, wherein said outer head plate is a first outer head plate, and further comprising a second outer head plate substantially identical to said first outer head plate, said outer head plates being respectively fixedly secured to the outermost ones of the inner head plates of the head stack.

8. The ratchet tool of claim 5, wherein said pawl is a first pawl, and further comprising a second laminated pawl substantially identical to said first pawl, said pawls being arranged for ratcheting engagement with the internal gear respectively at diametrically opposed locations thereon.

* * * * *